United States Patent [19]

Seal

[11] 4,083,233
[45] Apr. 11, 1978

[54] DRAG ADJUSTING DEVICE FOR FISHING REELS

[76] Inventor: James D. Seal, 711 8th Ave. N., St. James, Minn. 56081

[21] Appl. No.: 731,252

[22] Filed: Oct. 12, 1976

[51] Int. Cl.² ............................................. G01N 3/08
[52] U.S. Cl. .......................................... 73/95; 73/143
[58] Field of Search ................... 73/141 R, 143, 144, 73/95; 116/DIG. 34; 242/148

[56] References Cited

U.S. PATENT DOCUMENTS

| | | | |
|---|---|---|---|
| 1,503,831 | 8/1924 | Hovda | 73/141 R X |
| 2,544,128 | 3/1951 | Bell | 73/143 X |
| 2,807,957 | 10/1957 | Decker | 73/143 |
| 3,166,269 | 1/1965 | Veroli | 73/143 X |
| 3,246,859 | 4/1966 | Martin | 73/143 X |

Primary Examiner—Charles A. Ruehl
Attorney, Agent, or Firm—Stuart R. Peterson

[57] ABSTRACT

Two arms are hinged together at one end. Each arm contains a plurality of longitudinally spaced and generally aligned passages. The spacing of the passages is such that a fishline can be threaded through selected passages so as to enable the fisherman to set the drag mechanism associated with his fishing reel for a desired percentage of the test or breaking strength of the fishline.

10 Claims, 5 Drawing Figures

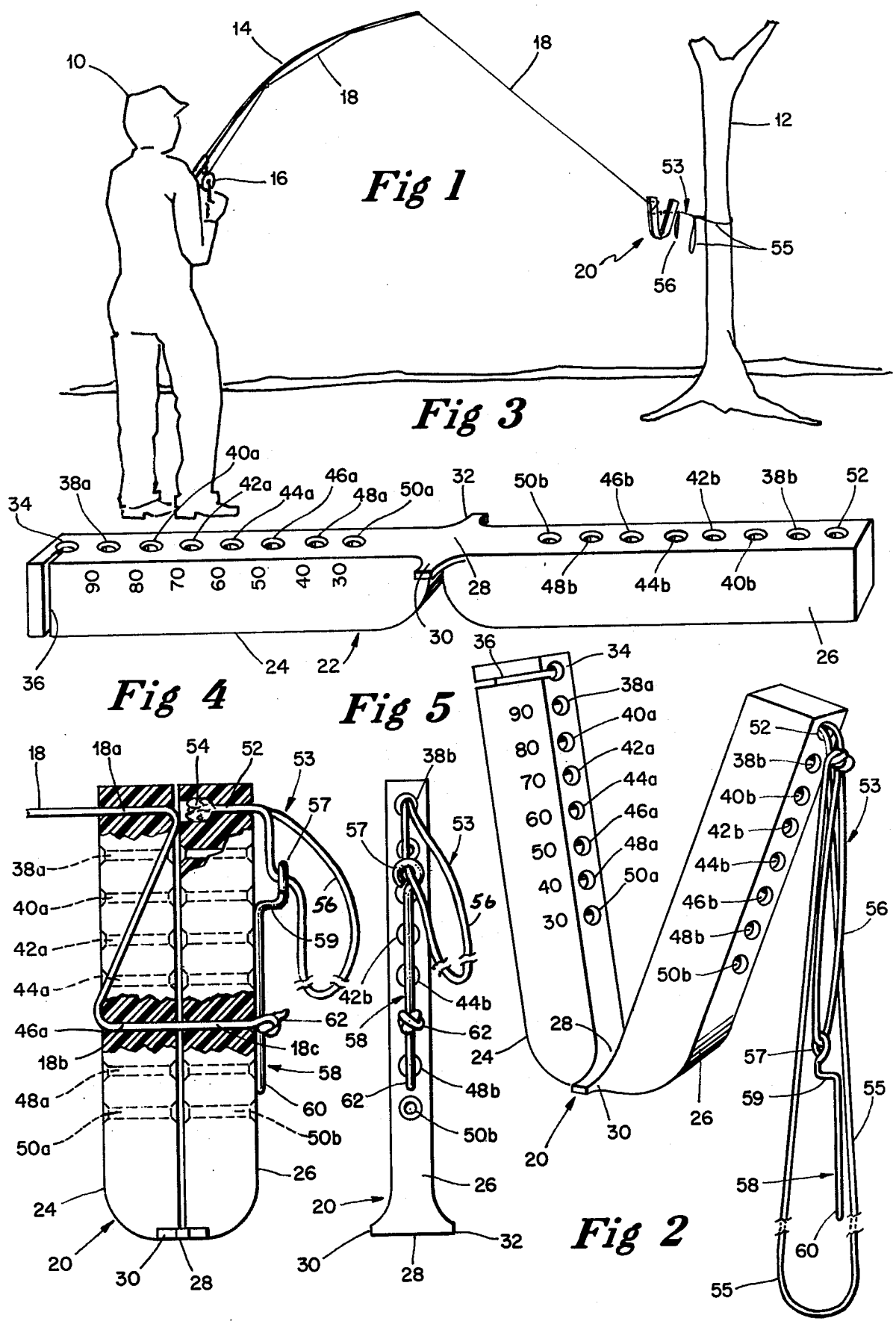

4,083,233

DRAG ADJUSTING DEVICE FOR FISHING REELS

BACKGROUND OF THE INVENTION

This invention relates generally to fishing accessories, and pertains more particularly to a device which allows the fisherman to adjust the drag mechanism associated with his fishing reel to a desired percentage of the breaking strength of the fishline.

It can be appreciated that it is exasperating to any fisherman to have his line or leader break due to an improper setting of the drag mechanism. Usually, the drag mechanism is adjusted or set by sheer guess. Consequently, when a fish seizes the fish hook it may very well impose a momentary load on the line of sufficient magnitude to snap or break the line (or the leader attached thereto) when the breakage could have been easily avoided by a proper drag setting. No portable device is known to me which will permit the fisherman to set the drag mechanism at an optimum percentage of the actual breaking strength of the line he is using at that moment.

SUMMARY OF THE INVENTION

Accordingly, an important object of the present invention is to provide a device that will enable the fisherman to set the drag at a known percentage of the line strength. In this regard, while the test strength of fishlines is normally given by the manufacturer, and thus known to the fisherman, my device permits the drag mechanism to be adjusted by breaking a section of the line itself, more specifically, only a small section at the very end of the line. Once the drag mechanism is set for a particular type of fishing, no further adjustment is needed.

Another object of the invention is to permit the fisherman to select the particular percentage that he feels will be best for the type of fishing he is going to engage in. For instance, if he is fishing for northerns, he might very well set his drag mechanism for a lower percentage of breaking strength than when fishing for walleyes. Of course, with my device he can easily change from one percentage to another, it only being necessary to break another small end section of the line, using my device again, but for the changed percentage he then desires.

A further object of the invention is to allow the fisherman to train himself during practice sessions so that he develops a good feel for the strength of the particular fishline. More specifically, if he plans to engage in fly fishing, which normally requires the use of a relatively long leader, he can fixedly attach my device to a tree or other object (or have it held by a friend) and then subject the leader to enough tension via his fishpole, doing so any number of times, until the leader is broken. After several such breakages and only loss of a few inches of leader, he will have developed the skill that he needs for playing fish properly and will have also developed a feel for the amount of retrieving force that should be applied after a fish is hooked. Consequently, it is not essential that he even use the drag mechanism on his fishing reel, for he can, if he chooses to do so, set the drag mechanism far above the line's test strength (or even use a reel without a drag mechanism), then relying upon the "feel" he cultivates from practice sessions.

Yet another object of the invention is to provide a compact device that can be easily carried in a fisherman's tackle box so that it is always available for adjusting and readjusting his reel's drag mechanism.

Still another object of the invention is to provide a device that is extremely simple, easy to use and which will be inexpensive to manufacture, thereby encouraging its widespread adoption by fishermen of virtually all levels of fishing proficiency and interest.

Another object of the invention is to provide a drag adjusting device that will be long lasting. In this respect, an aim of the invention is to provide a device of the foregoing character that can be made of plastic which will not rust and which is sufficiently rugged so as to be virtually indestructible.

Briefly, a device constructed in accordance with the teachings of my invention comprises a pair of elongated plastic arms that are integrally joined at one end, the juncture at the joined ends being relatively thin so that a hinge is provided. Each arm is formed with a plurality of passages or holes extending therethrough which are in general alignment with each other so that the fisherman can select whatever pair of aligned passages will result in a breaking force being applied to the end section of the fishline between the two arms. The force applied to the fishing line via the reel will be a known percentage of this breaking force. It is planned that appropriate indicia be embossed on one of the arms which will indicate the various percentages so that he can select the appropriate or desired percentage. His drag mechanism, if a good one, will then be set for the selected percentage and the force subsequently applied to the line will not exceed that percentage, thereby assuring that the line will not be broken during use.

BRIEF DESCRIPTION OF THE DRAWINGS

FIG. 1 shows my device actually being used to set the drag on the drag mechanism on a conventional fishing reel;

FIG. 2 is a perspective view of my device, the arms having an angulation corresponding to that depicted in FIG. 1;

FIG. 3 is another perspective view, this view showing the arms in a generally straight-line relationship with each other;

FIG. 4 is a side elevational view of my device after a fishline has been attached thereto but before any retrieving force is applied to the line in FIG. 1, portions having been broken away in order to show to better advantage certain of the passages, and FIG. 5 is an end elevational view taken from the right in FIG. 4.

DESCRIPTION OF THE PREFERRED EMBODIMENT

In FIG. 1, a fisherman 10 and a tree 12 have been pictured, the fisherman labeled 10 holding a fishing rod 14 having either a casting or spinning reel 16 mounted thereon which is equipped with a typical drag mechanism (not visible). Extending from the reel 16 is a fishline 18. Tied to the tree 12 is my drag adjusting device which has been denoted generally by the reference numeral 20.

Because of its larger scale, the complete device 20 is better illustrated in FIG. 2. Although the device 20, as illustrated in FIG. 2, has substantially the same angulation that it has in FIG. 1, it will be noted that the device in FIG. 2 does not have the fishline 18 attached thereto. Stated somewhat differently, the device of FIG. 2 represents what the fisherman would purchase.

Perhaps it will be more beneficial to refer at this stage to FIG. 3, for FIG. 3 permits an understanding of how the device 20 can be fabricated. In this regard, the unit 22 lends itself readily to molding techniques and it is planned that an appropriate plastic, such as polypropylene, be employed. Therefore, the unit 22 comprises a first relatively rigid arm 24 and a second relatively rigid arm 26. The adjacent ends of the arms 24, 26 are hingedly connected together at 28. To impart added strength and to permit the hinge 28 to be flexed innumerable times, side tabs 30 and 32 are provided. In other words, the tabs 30, 32 reinforce the thin section forming the hinge 28, yet still permit facile bending in this region.

It will be observed that the arms 24 and 26 have a rectangular cross section. A first passage or hole 34 extends parallel to the relatively wide sides, passing completely through the arm from one narrow side to its opposite narrow side. For a purpose presently to be explained, a slot 36 functions as an access opening, leading from one wide side into the passage 34. In addition to the passage 34, the arm 24 has seven additional passages 38a – 50a. Similarly, the arm 26 has passages 38b – 50b corresponding in number and spacing to passages 38a – 50a. More specifically, the passage 38b, for instance, is spaced the same distance from the hinge 28 as is the passage 38a. The passage 50b is spaced the same distance from the hinge 28 as is the passage 50a. Likewise, the passages 40a, 40b; 42a, 42b; 44a, 44b; 46a, 46b; and 48a, 48b have the same respective spacings. Consequently, when the unit 22 is flexed into the relationship shown in FIG. 4, the passages 38a – 50a are in alignment with the passages 38b – 50b, respectively.

Still another passage is provided in the arm 26, this being the passage labeled 52. The purpose of the passage 52, which is enlarged or counterbored at one end, is to permit the attachment of a flexible cord 53 having its two ends tied in a knot 54 received in the enlarged end of the passage 52. The cord 53 is also tied intermediate its ends to form a relatively large loop 55 and a smaller loop 56. An attempt has been made to show the loops 55 and 56 in FIGS. 1 and 2, but for drafting reasons only the loop 56 has been shown in FIGS. 4 and 5. Because the loop 55 is intended to be large enough so as to encircle a tree, such as the tree 55 in FIG. 1, the loop 55 becomes too large for proportional illustration, as is believed readily understandable. The section threaded through the eye 57 of a pin 58 has an offset portion 59 and a straight shank 60. When the shank 60 is not in use, the pin 58 dangles in a manner shown in FIG. 2. However, when the pin 58 is in use, it is in the position shown in FIGS. 4 and 5. In this regard, it will be appreciated that the shank 60, owing to a knot 62 at the end of the fishline 18, prevents the fishline from being pulled back through the passages 46a and 46b that have been selected as far as the drag adjustment is concerned.

In actual practice, the various passages 38a – 50a (or the passages 38b – 50b) would have the appropriate percentages embossed or molded in the narrow side of the arm 24 that is uppermost in FIG. 3. This would be the logical place for the indicia, for the upper part of the two-part mold could have the numerals formed therein so as to permanently mold them immediately adjacent the entrances of the passages 38a – 50a. However, since the indicia is quite small, it would not be discernible if applied to the narrow side that has just been alluded to. Consequently, for drafting simplicity the numerals have been applied to the wide side but nonetheless in sufficiently close proximity to the particular passages to be identified so as to apprise the fisherman as to which passages he should select in order to achieve a drag setting that will possess the desired percentage of the actual force the fishline 18 can withstand.

Before presenting an operational sequence, it perhaps will be helpful to recognize that the unit 22 can be readily and inexpensively, molded in one piece, only a simple two-part mold being needed. Since the passages 34 and 38a – 50a extend completely through the arm 24 and the passages 38b – 50b and 52 extend completely through the arm 26, the lower mold can have a cavity corresponding generally to the configuration of the arms 24, 26 as well as the hinge 28 and tabs 30, 32.

Since it is well to have the various passages 34 and 38a – 50a and the passages 38b – 50b and 52 formed with flared ends, it is intended that the lower mold be provided with pins extending upwardly from the bottom of its cavity which terminate approximately midway of the height of the arms 24, 26 as viewed in FIG. 3. Similarly, the same number of pins would extend downwardly from the upper mold to a distance that would be halfway down so that the resulting passages extend completely from the narrow side that is uppermost in FIG. 3 to the bottom narrow side. In addition, the slot 36 can be formed by an inwardly directed "key" on the lower mold.

Although the molding, as such, does not constitute part of my invention, nonetheless it is important to appreciate how simply the injection molding can be effected inasmuch as it results in an extremely low-cost device 20.

Turning now to a brief description of how my device 20 is to be used, it will be assumed that the fisherman 10 desires to set the drag mechanism associated with the reel 16 attached to his rod 14 for 50% of the test strength of the line 18. He first flexes the two arms 24, 26 into a substantially U-shaped relation as illustrated in FIG. 4. This automatically brings the passages 46a, 46b, which are midway between the hinge 28 and passage 34, into alignment with each other.

Having done this, he takes the free end of the line 18 and threads it through the passages 46a, 46b. He advances enough of the fishline 18 beyond the arm 24 so as to be able to tie the knot 62 on the shank 60 of the pin 58. The cord loop 56 can be sufficiently large so that the pin 58 can be held while the knot 62 is tied.

Once the knot 62 is tied, the shank 60 prevents any withdrawal of the fishline from the passages 46a, 46b. The fisherman can then slip a portion of the fishline 18 through the slot 36 into the passage 34. Actually, the fisherman has a number of choices available to him at this particular stage. The slot 36 facilitates the completion of the attaching procedure, however. Although not clearly visible in FIG. 1, once the line 18 has been inserted through the slot 36 into the passage 34, the fisherman wraps a section of the fishline 18 around the end of the arm 24 so as to anchor it in place. Another choice would be to insert the end of the fishline forming the knot 62 through a number of the other passages in the arm 24 and then through the passages 46a, 46b so that the undulated configuration keeps the line 18 from slipping when the reel 16 is rotated to take up or "retrieve" the line.

At this stage of the operational description, it will be helpful, it is believed, to assign reference characters to certain portions of the fishline 18. In this regard, it will be discerned from FIG. 4 that the portion of the fishline 18 received in the passage 34 has been labeled 18a, the portion received in the passage 46a by the reference character 18b and the portion residing in the passage 46b by the reference character 18c. When the reel 16 is operated so as to impose a takeup or retrieving force on the line 18, the portion 18a cannot move because a section of the line 18 is wrapped about the free end of the arm 24. Hence, when initially applying the force to the line 18 the arm 24 is pulled in a diverging direction with respect to the arm 26, the hinge 28 readily permitting the spreading of the two free ends of the arms 24, 26. Since the knot 62, by reason of it being tied to the shank 60, cannot move, neither of the portions 18b, 18c can move relative to each other.

Consequently, when a sufficient pull has been exerted on the fishline 18 via the reel 16, a greater force is applied to the section of the fishline spanning the arms 24, 26, this being the section immediately between the two portions having been identified as 18b and 18c. The fisherman 10 keeps winding until there is an actual breakage of the line between the portion 18b and 18c. Since the passages 46a, 46b are located midway between the hinge 28 and the passage 34, it follows that twice the force applied by the reel 16 is applied to the section of the fishline between portions 18b, 18c.

Although in FIG. 1 the device 20 is attached to the tree 12, it can be anchored to virtually any fixed object. As a matter of fact, the fisherman 10 can insert one foot through the loop 55 when winding the reel 16 in a direction to impose a takeup or retrieving force on the line 18. Also it can be held by another fisherman.

It should also be evident that various other passages 38a, 38b and the like can be selected. If the passages 38a, 38b are used, then the drag will be set for only 10% less than the breaking strength of the fishline 18. On the other hand, if the passages 50a, 50b are selected, then a wide margin of safety is realized because the drag mechanism would be adjusted for only 30% of the line's breaking strength.

It is important to recognize, though, that the actual fishline 18 is being used in the setting of the drag mechanism. If, for instance, the fishline 18 has a rated test strength of 10 pounds, yet it actually will break when subjected to force of 8 pounds, the device 20 will automatically take this into account. Thus, whereas the rated test strength is important to the fisherman when buying the fishline, and also when selecting the line from others he may have in his tackle box, it is the actual strength of the line 18 that is taken into account when using my device 20 and not the rated test strength. Consequently, even if it were possible to adjust a drag mechanism for a given percentage of the rated test strength listed by the manufacturer, such a device not being known to me, my invention goes a step further in that the actual line itself is made use of in effecting the drag setting. Hence, the fisherman is always assured of setting the drag correctly when utilizing my invention.

It is believed obvious that once the section of fishline 18 residing between the arms 24 and 26, that is between the portion labeled 18b and 18c, has been broken as has just occurred in FIG. 1, then the portion wrapped around the free end of the arm 24 can be unwrapped and the now loose portion 18b pulled readily from the passage 46a and on through the passage 34. There is no need to remove the fishline through the slot 36. Of course, the portion 18c is wasted, but this constitutes an extremely small section of line, being only on the order of an inch or so. It readily falls from the passage 46b and the knot 62 can be slipped off the free end of the shank 60.

I claim:

1. A drag adjusting device for fishing reels comprising first and second elongated members, and hinge means connecting said elongated members together at one end, said first member having first means for engaging a first portion of a fishline extending from a fishing reel and second means between said first means and said hinge means for engaging a second portion of the fishline, said second member having third means for engaging a third portion of the fishline, said third means being spaced from said hinge means substantially the same distance as said second means is spaced from said hinge means, whereby when said third portion of said fishline is anchored to said second member and a force applied to said first portion sufficient to break the section of fishline between said second and third fishline portions, the force applied to said first portion of the fishline is less than the breaking strength of said section between said second and third portions and hence less than the breaking strength of the fishline.

2. A drag adjusting device in accordance with claim 1 in which said first and second means constitute first and second passages extending through said first member and in which said third means constitutes a passage extending through said second member.

3. A drag adjusting device in accordance with claim 2 in which said first member has additional passages between said first and second passages, and said second member has additional passages in general alignment with the additional passages in said first member, whereby said second and third fishline portions can be received in any one of said additional passages in said first member and in any one of said additional passages in said second member which last-mentioned additional passage is in general alignment therewith.

4. A drag adjusting device in accordance with claim 3 in which the location and spacing of said passages in said first member and the location and spacing of said passages in said second member provide predetermined percentages of the breaking strength of the fishline.

5. A drag adjusting device in accordance with claim 4 in which said passages are spaced so as to provide 10% variations.

6. A drag adjusting device in accordance with claim 5 including numerical indicia associated with the passages in one of said members denoting the particular percentages of breaking strength.

7. A drag adjusting device in accordance with claim 6 in which said elongated members constitute plastic arms.

8. A drag adjusting device in accordance with claim 7 in which said hinge means constitutes a relatively thin and flexible plastic section which is integral with said arms.

9. A drag adjusting device in accordance with claim 8 in which said arms have a rectangular cross section providing relatively wide and relatively narrow sides, said passages having flared ends in the relatively narrow sides of said arms and said passages extending through said arms in a direction parallel to the relatively wide sides of said arms.

10. A drag adjusting device in accordance with claim 9 in which said relatively thin hinge section is provided with tabs projecting in opposite directions from said hinge section beyond the relatively wide sides of said arms.

* * * * *